(No Model.) 4 Sheets—Sheet 2.
J. W. BAPPLE.
SELF DROPPING CORN PLANTER AND CHECK ROWER.
No. 303,788. Patented Aug. 19, 1884.
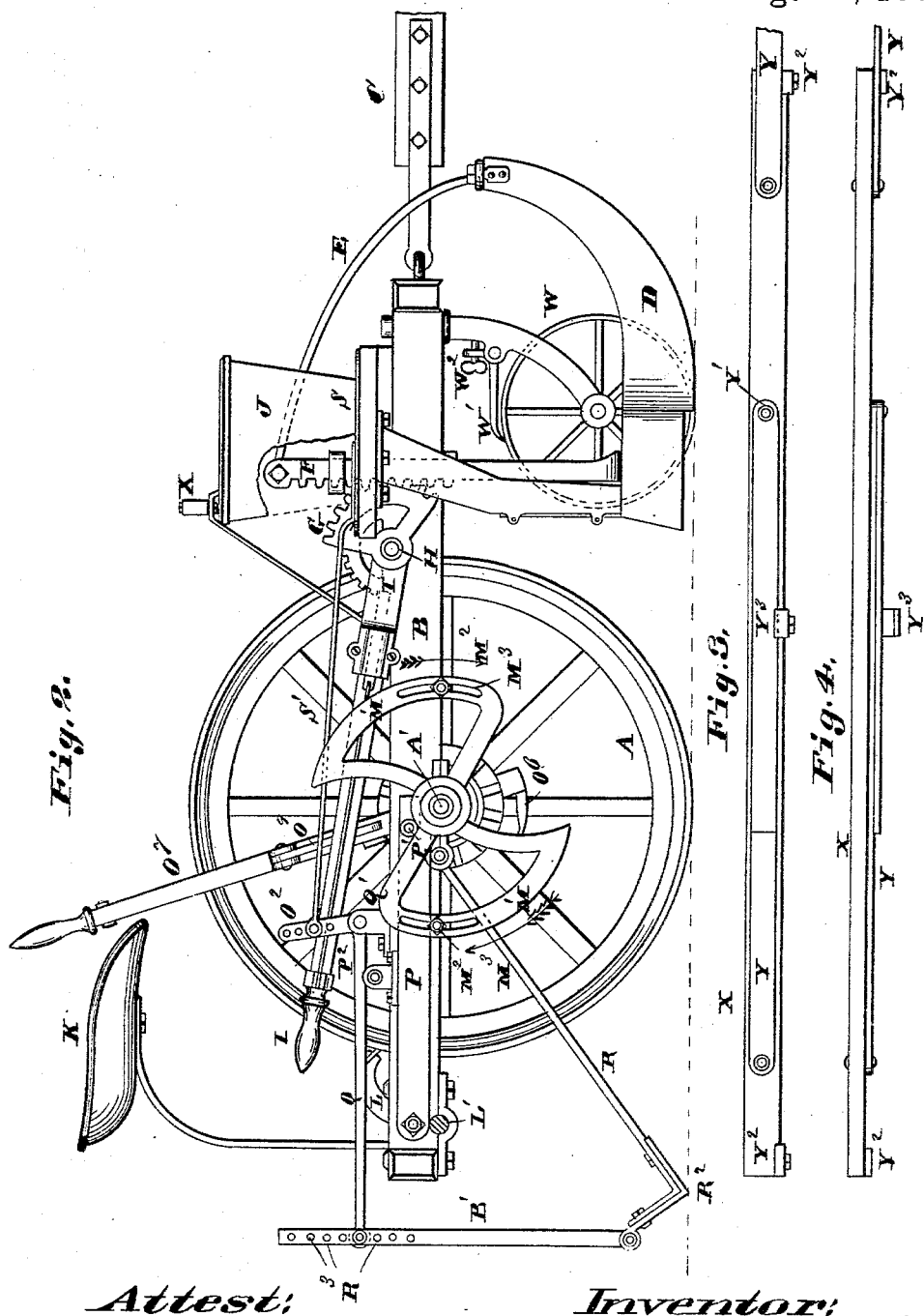

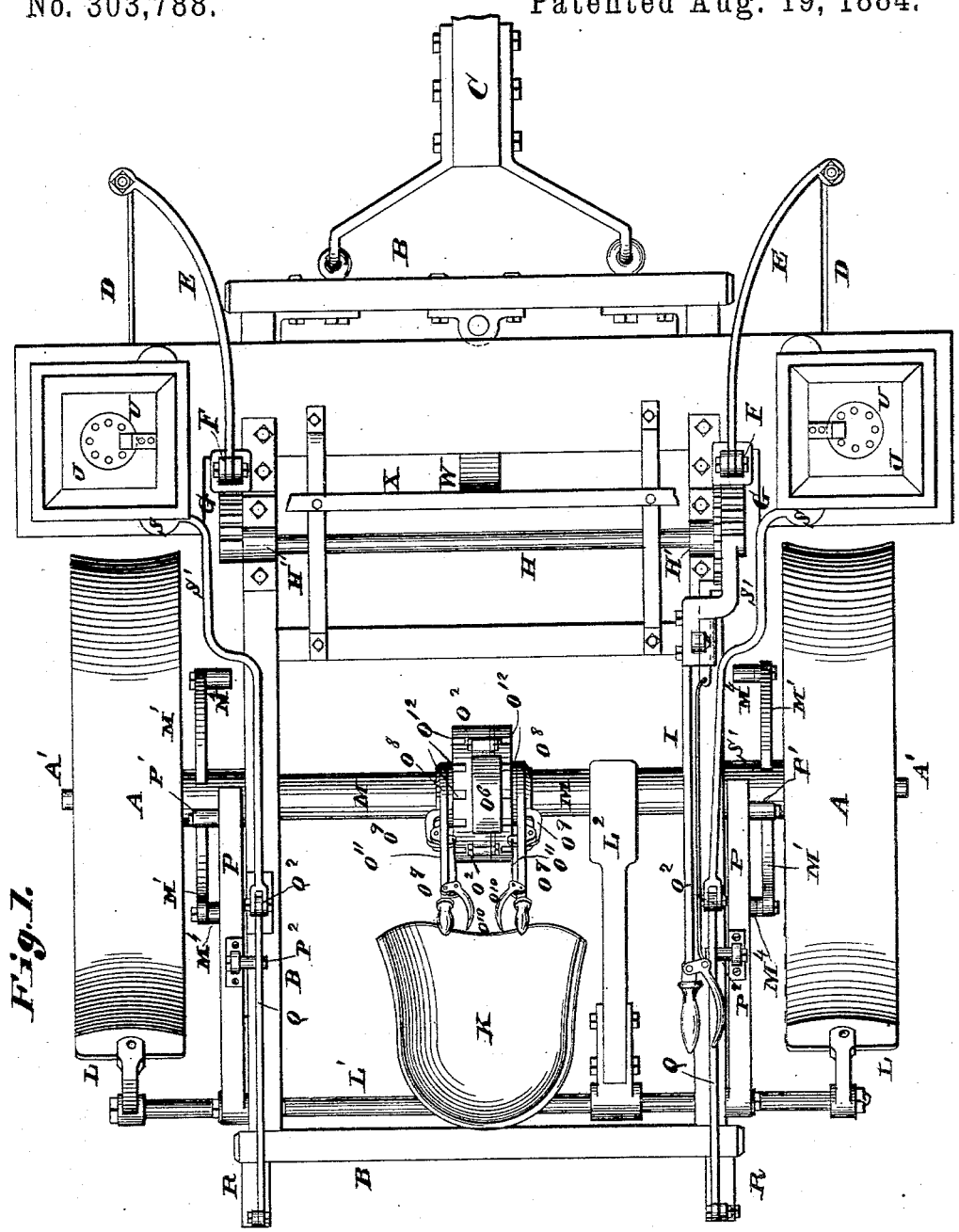

(No Model.) 4 Sheets—Sheet 3.
J. W. BAPPLE.
SELF DROPPING CORN PLANTER AND CHECK ROWER.
No. 303,788. Patented Aug. 19, 1884.
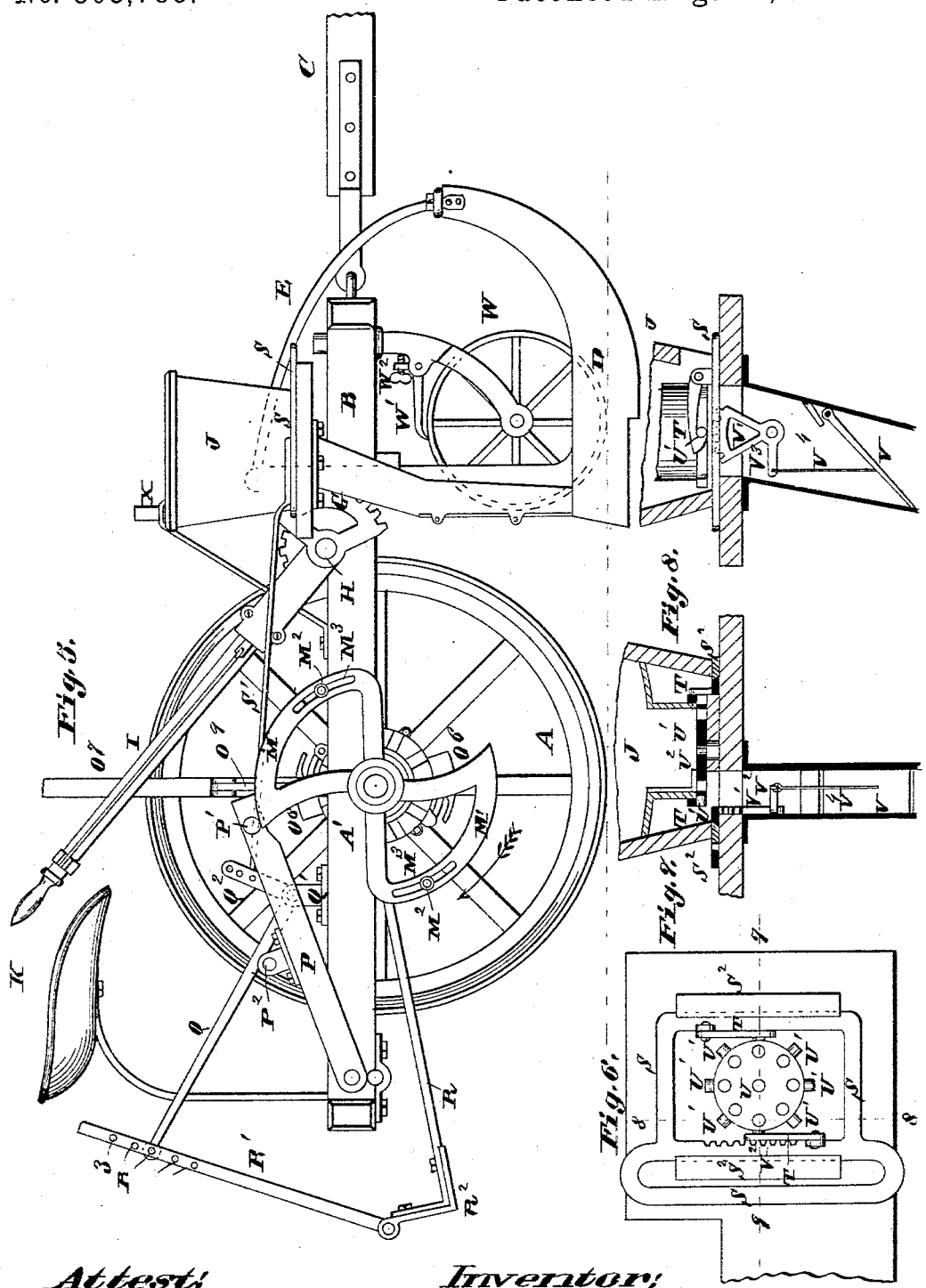

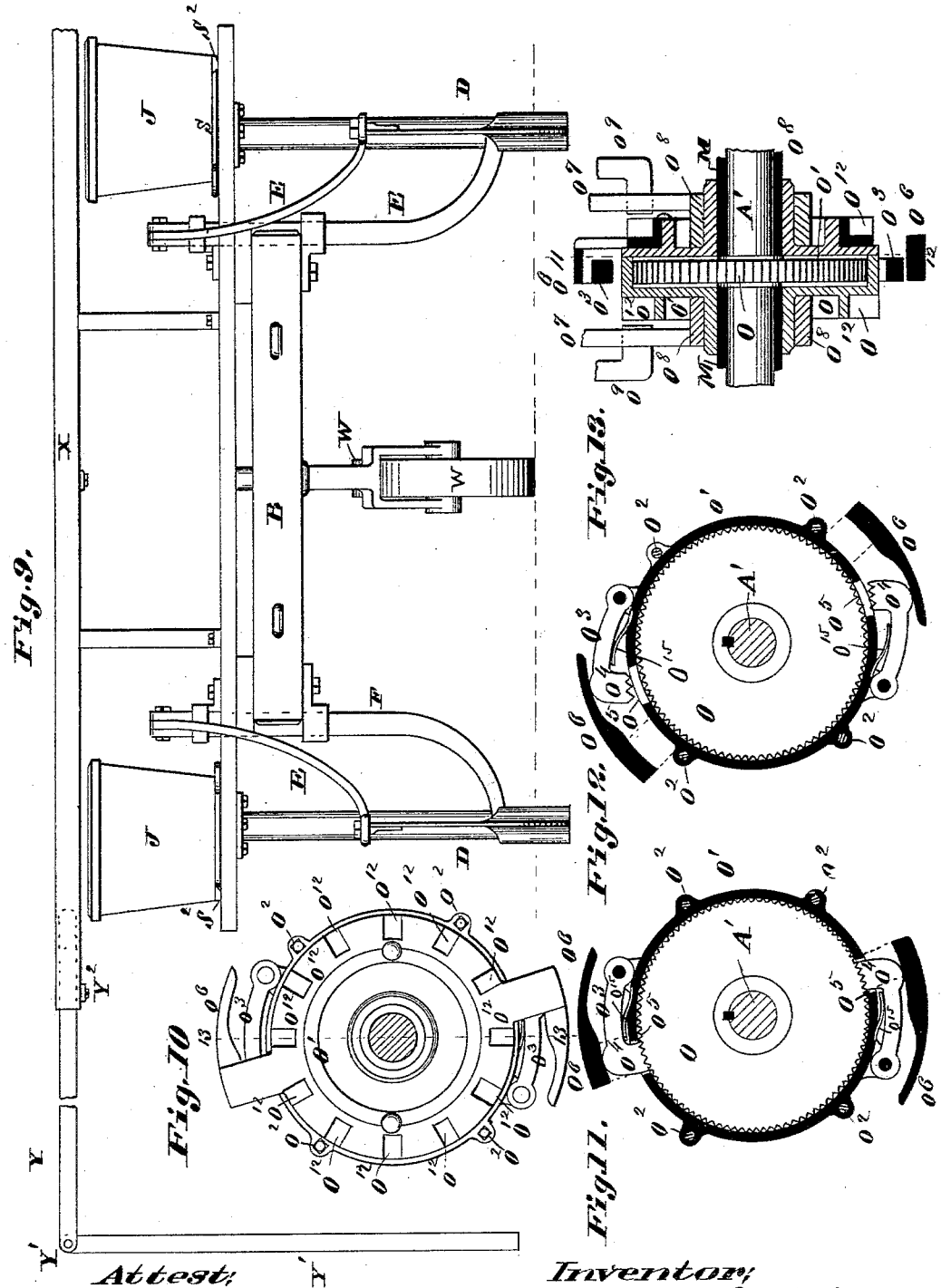

UNITED STATES PATENT OFFICE.

JAMES W. BAPPLE, OF SEDALIA, ASSIGNOR OF ONE-HALF TO JOSEPH ENGLAENDER, OF ST. LOUIS, MISSOURI.

SELF-DROPPING CORN-PLANTER AND CHECK-ROWER.

SPECIFICATION forming part of Letters Patent No. 303,788, dated August 19, 1884.

Application filed March 19, 1884. (No model.)

*To all whom it may concern:*

Be it known that I, JAMES W. BAPPLE, of Sedalia, in the county of Pettis and State of Missouri, have invented a certain new and useful Improvement in Combined Self-Dropping Corn-Planters and Check-Rowers, of which the following is a full, clear, and exact description, reference being had to the accompanying drawings, forming part of this specification, and in which—

Figure 1 is a top view. Fig. 2 is a side elevation, with one wheel removed. Figs. 3 and 4 are side and edge views, respectively, of the guides and their supporting-rail. Fig. 5 is a side view, with the marker raised and one wheel removed. Fig. 6 is a top view of the interior of one of the seed-boxes. Fig. 7 is a vertical section of the seed-dropping apparatus taken on line 7 7, Fig. 6. Fig. 8 is a similar view taken on line 8 8, Fig. 6. Fig. 9 is a view of the front of the machine, the parts back of the shoes being removed. Fig. 10 is an enlarged side view of the clutch. Figs. 11 and 12 are sections taken on line 11 12, Fig. 13, Fig. 11 showing the parts connected and Fig. 12 showing them disconnected. Fig. 13 is a section taken on line 13 13, Fig. 10.

This invention relates, principally, to the marking and dropping attachment; and it consists in features of novelty hereinafter fully described, and pointed out in the claims.

Referring to the drawings, A represents the ground-wheels; B, the frame; C, the tongue; D, the shoes; E, braces supporting the shoes; F, racks secured to and projecting upward from the shoes; G, segments engaging the racks; H, shaft to which the segments are secured, and which is journaled in boxes H', secured to the frame; I, a lever secured to the shaft to turn it, to raise and lower the shoes; J, seed-box; K, driver's seat; L, scrapers for the ground-wheels; L', shaft to which the scrapers are secured, and which is journaled in boxes secured to the frame, and L² a treadle secured to the shaft L' to press the scrapers against the wheels. All of these parts are shown and described in patents granted to myself and assignee, Joseph Englaender, October 24, 1882, and August 21, 1883, and will need no further description here.

The wheels A are rigidly secured to an axle or shaft, A', and surrounding this axle, between the wheels, is a sleeve or hollow shaft, M, made in two parts.

Rigidly secured to the axle, between the two parts of the sleeve, is a wheel, O, with notches or teeth on its periphery. (See Figs. 11, 12, and 13.) On each side of the wheel is a disk, O'. These disks are secured to the sleeve—one to each part—and one of them is turned over on its outer edge to meet the other, as shown in Fig. 13, and thus the two inclose the wheel. They are connected by bolts O², passing through lugs. (See Figs. 1, 10, 11, and 12.) Pivoted to the periphery of the disks are dogs or pawls O³, with heads O⁴, having teeth, as shown in Figs. 11 and 12. Openings O⁵ are made in the turned-over edge of the disk to receive the heads of these dogs, to allow them to be forced in from the position shown in Fig. 12 to that shown in Fig. 11, to engage them with the wheel O. They are held out when not forced in by springs O¹⁵, and they are forced in by cams O⁶, secured to one of the disks, which are turned by hand-levers O⁷, which have rings O⁸ on their lower ends, that surround the hubs of the disks. The levers are locked to the disks to turn them and the cams (to force the free ends of the dogs inward) by means of pawls O⁹, hinged to the levers and operated by latches O¹⁰, hinged to the upper ends of the levers, to which they are connected by rods O¹¹. When forced inward, the pawls engage notches O¹² in the disks. As soon as the dogs are locked to the wheel the pawls are disengaged from the disks, and the axle and sleeve are then locked, and will turn together, and they may be disconnected at any time by simply engaging the levers with the disks again and moving them backward. The wheel and disks are disconnected when it is desired to move the machine from one place to another without operating it.

Rigidly secured to the outer ends of the sleeve M, outside or inside of the frame, as desired, are cams M', which are turned in the direction shown by the arrows, Figs. 2 and 5, when the sleeve is locked to the axle, as described, and the planter moved forward. These cams are provided with projections M², secured in slots M³, so as to be adjustable and preferably having friction-rollers M⁴ surrounding them.

Hinged to the frame and extending forward toward the front end of the machine are levers P, which are engaged and raised by the projections on the cams as the cams are turned, and after the projections on the cams leave the levers they (the levers) are further sustained (see Fig. 5) before being allowed to drop, by projections P' thereon engaging the peripheries of the cams. As soon as the cams have passed the projections P', which may be provided with friction-rollers, if desired, the levers drop from the position shown in Fig. 5 to that shown in Fig. 2, and then are immediately raised again by the cams. Extending from the levers are other projections, P², which may also be provided with friction-rollers, that, as the levers are raised, come in contact with and lift arms Q, pivoted to the frame by brackets Q' or otherwise. These arms are connected by means of bars or rods R' to markers R, hinged to the frame and having points R², to make impressions in the ground as they fall upon it. The bars R' are pivoted to the markers, and may have a number of holes, R³, for the connection of the arms Q, so that the amount of movement given to the markers may be regulated as desired. It will thus be seen that the markers will rise and fall with the levers P, and their dropping coincides with the dropping of the corn. The arms Q have cranks Q² connected by means of rods S' with sliding frames S, located beneath the seed-boxes, and held in place by guides S². (See Figs. 6 and 7.) Pivoted to this frame are pawls T, which engage with pins U' on perforated disks U, pivoted in the bottom of the boxes by posts U², around which they turn. As the frames S are moved in one direction the disks are turned by one of the pawls of each frame, the other pawl slipping over the next projection of the disk of each box and moving the disk as the frame is moved in the other direction. The corn drops through the disks in the ordinary manner, and it will be seen that each time the levers P are raised and lowered the disks will be turned. The corn drops from the seed-boxes into the legs of the shoes, and is arrested each time by valves V, hinged in the legs, and operated by segments V', engaged by racks V² on the frames S. The segments are provided with cranks V³, to which the valves are connected by rods V⁴. The valves are thus opened and closed each time the frames are moved, and the corn in the chambers above the valves dropped to the ground before another charge is dropped from the seed-boxes. The dropping of the corn from the chambers above the valves is (or takes place) simultaneous with the dropping of the markers upon the ground.

Secured to the front part of the frame is a caster-wheel, W, to support the front part of the machine. It is provided with a scraper, W', adjusted by a set-screw, W².

X represents a rail secured to the front part of the machine, to which are hinged arms Y, (see Figs. 1, 2, 3, 4, and 9,) which are jointed at Y and can be thrown out, as shown on the left side of Fig. 9, when they will act as guides by hanging over the impressions made in the ground by the markers. When in their outer position, they are sustained by brackets Y², and when folded up they are supported by brackets Y³. (See Figs. 3 and 4.)

I claim as my invention—

1. The combination of a drop-marker frame to which the marker is hinged, a lever hinged to the frame above the drop-marker, an arm by which the drop-marker is lifted hinged to the frame and connected by a crank to the seed-slide, and cams by which the lever is elevated to lift the arm to operate the seed-slide and raise the marker, as set forth.

2. The combination of a drop-marker, an arm having a crank and connected to the drop-marker, seed-slide rod connected to the crank, and a cam by which the arm is elevated to lift the drop-marker and operate the seed-slide, as set forth.

3. In a corn-planter, the combination of the ground-wheels, axle to which the wheels are secured, sleeve surrounding the axle, suitable clutch for connecting the axle and sleeve, cams secured to the sleeve, formed as shown, and provided with projections, levers hinged to the frame of the machine and adapted to be engaged by the projections on the cam, arms provided with cranks connected to disks in the seed-boxes by means of a sliding frame and pawls, and the hinged markers connected to the said arms, all substantially as and for the purpose set forth.

4. In a corn-planter, the combination of the axle and sleeve connected by means of a notched wheel secured to the axle, disks secured to the sleeve, pawls secured to the disks, and having notched heads adapted to enter holes in the disks and engage the wheel, and cams secured to the disks, substantially as and for the purpose set forth.

5. In a corn-planter, in combination with the axle, sleeve, wheel, disks, pawls, and cams arranged and operating substantially as described, the levers provided with pawls adapted to turn the disks to lock and unlock the parts, as specified.

6. In a corn-planter, the combination of the sliding frame, pawls pivoted thereto, perforated disk provided with pins to receive the pawls, rack upon the frame, segment secured beneath and engaged by the rack, and having a crank, and a valve pivoted to the leg of the shoe and connected to the crank of the segment, all arranged and operating substantially as set forth.

JAMES W. BAPPLE.

In presence of—
GEO. H. KNIGHT,
BENJN. A. KNIGHT.